United States Patent [19]

Desai et al.

[11] Patent Number: 5,340,339

[45] Date of Patent: Aug. 23, 1994

[54] WIRE COVER FOR AN AIR BAG INFLATOR

[75] Inventors: Trilok Desai, Bloomfield Township, Oakland County; Gregory N. Goestenkors, Waterford; Mohamed Boumarafi, Rochester Hills, all of Mich.

[73] Assignee: AlliedSignal Inc., Morristown, N.J.

[21] Appl. No.: 19,722

[22] Filed: Feb. 19, 1993

[51] Int. Cl.⁵ .............................................. H01R 13/52
[52] U.S. Cl. .................................. 439/892; 174/138 F
[58] Field of Search .......................... 439/521–523, 439/281, 282, 892, 893; 174/138 F, 65 R

[56] References Cited

U.S. PATENT DOCUMENTS

| | | | |
|---|---|---|---|
| 2,670,870 | 3/1954 | Fleischer | 174/138 F |
| 4,281,214 | 7/1981 | Miyamoto et al. | 174/138 F |
| 4,291,932 | 9/1981 | Cox | 439/521 |
| 5,120,237 | 6/1992 | Fussell | 439/282 |

FOREIGN PATENT DOCUMENTS 2637617  2/1978  Fed. Rep. of Germany ... 174/138 F Primary Examiner—Neil Abrams
Attorney, Agent, or Firm—Markell Seitzman

[57] ABSTRACT

A cover for protecting at least one wire extending from an air bag inflator comprising: a top (52), including a circular shaped first portion (54) and a narrow three-sided flange portion (56) extending radially outward from first portion; a circularly shaped first wall (58) having first (60) and second ends (62) and a bottom surface defining a shoulder (64) extending downwardly from the first portion, the first wall terminating proximate the location of the flange portion to define a space (65) between the first and second ends of the first wall. An inner surface (66) of the first wall includes a diameter smaller than the diameter of an the end portion (24) of the inflator. The cover additionally includes a circularly shaped second wall (70) extending downwardly from the first wall, having an inner (72) surface. A groove (74) is formed within the inner surface, to receive an edge of the end portion (24). The second wall includes a portion (80) which extends upwardly to join the first and second ends of the first wall closing the space (65) therebetween; and axial slits for permitting the second wall to flex.

10 Claims, 5 Drawing Sheets

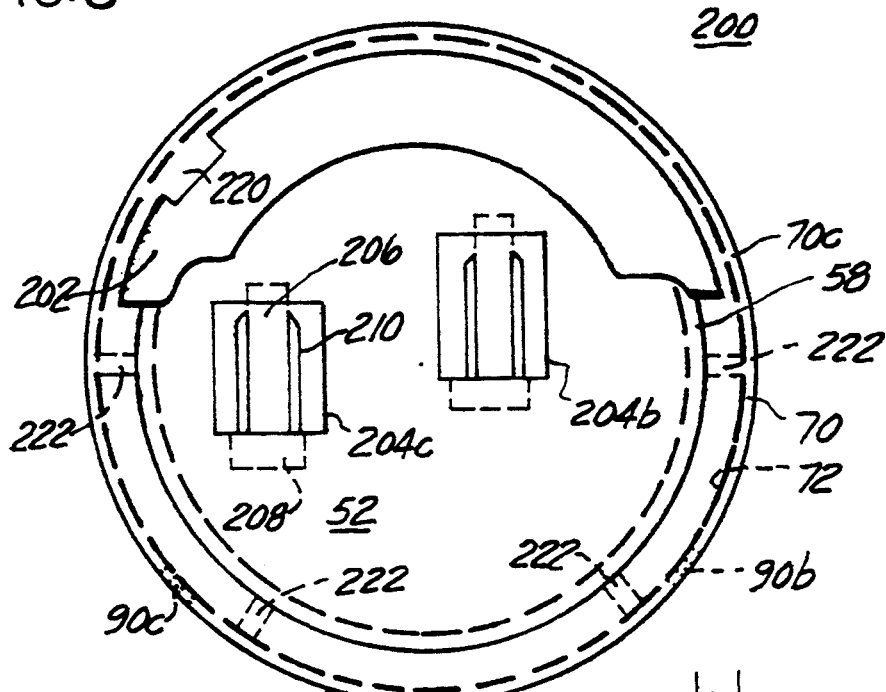
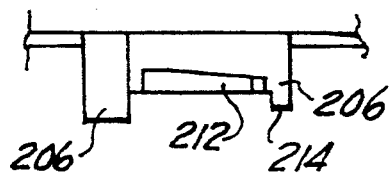
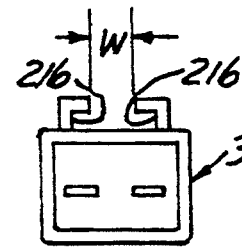
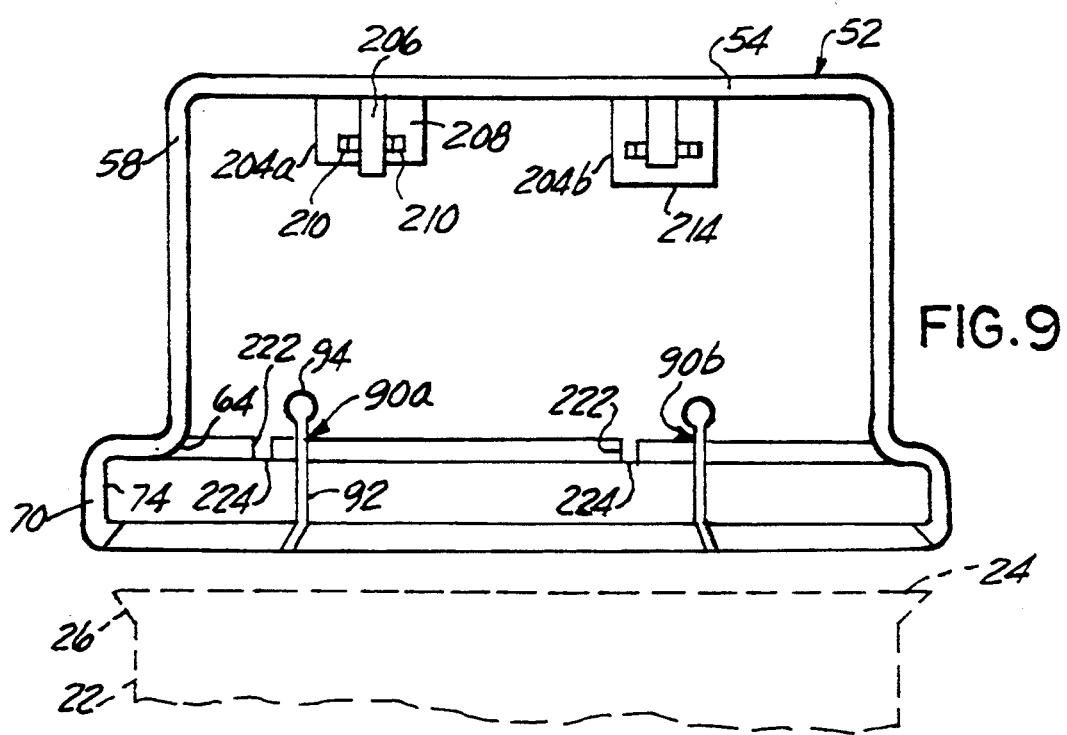

WIRE COVER FOR AN AIR BAG INFLATOR

BACKGROUND AND SUMMARY OF THE INVENTION

The present invention relates generally to a protective cover and more specifically to a wire cover for protecting wires extending from an inflator used to inflate an air bag.

FIG. 1 illustrates a plan view of a typical inflator 20 which inflates a closely spaced air bag (not shown). The inflator 20 includes a main body 22 and an end portion 24. Typically the diameter of the end portion 24 is larger than the diameter of the body 22 providing a step, lip or ledge 26 which peripherally extends about the body 22. All known inflators include a pyrotechnic element often called a squib. When the squib is electrically activated, it begins a chain reaction which generates or releases inflation gas through one or more openings 28 in the inflator 20. At least one wire 30 is used to communicate a control signal to the squib from a control module. As illustrated in FIG. 1 a pair of twisted or braided wires is shown. The wires may be held together by a Teflon sleeve 32, in a known manner. As can be seen from FIG. 1, the dimension (d) defines the effective diameter across the wire(s). The wires 30 terminate in a connector 34 which is attached to a mating connector located proximate the inflator. Quite often, the mating connector (36) is located on a cooperating structure such as on a housing which supports the inflator 20. As can be appreciated, when the connector 34 is mated to connector 36, the wires will form a loop.

It can be also appreciated, during the assembling of the inflator 20 into an air bag module, the inflator 20 must be moved from location to location. The wires 30 extending from the inflator, either as a loop or length of wire lend themselves to be used as a handle from which the inflator 20 is suspended. If the inflator is so handled there is a possibility that the wires may become damaged such as creating an open circuit. Further, if the inflator is a stored gas type of inflator, which typically includes a pressure vessel it may include a pressure sensor to sense pressure inside the also pressure vessel. In this situation the inflator would include an additional wire or wires with a corresponding connector communicated to an electrical sensing circuit.

It is an object of the present invention to provide a cover for protecting wires which extends from an inflator.

Accordingly, the invention comprises: a cover for protecting at least one wire extending from an air bag inflator comprising: a top; a first wall extending downwardly from the top. The cover additionally includes a second wall extending downwardly from the first wall, having an inner surface. A groove is formed within the inner surface, to receive an edge of the inflator and the second and or first wall includes slits which permit the wall to flex. Other embodiments of the invention illustrate means for securing wire connectors internally within the cover.

Many other objects and purposes of the invention will be clear from the following detailed description of the drawings.

BRIEF DESCRIPTION OF THE DRAWINGS

In the drawings:

FIGS. 8 through 11 show an alternate embodiment of the invention.

BACKGROUND AND SUMMARY OF THE INVENTION

Figure 1:
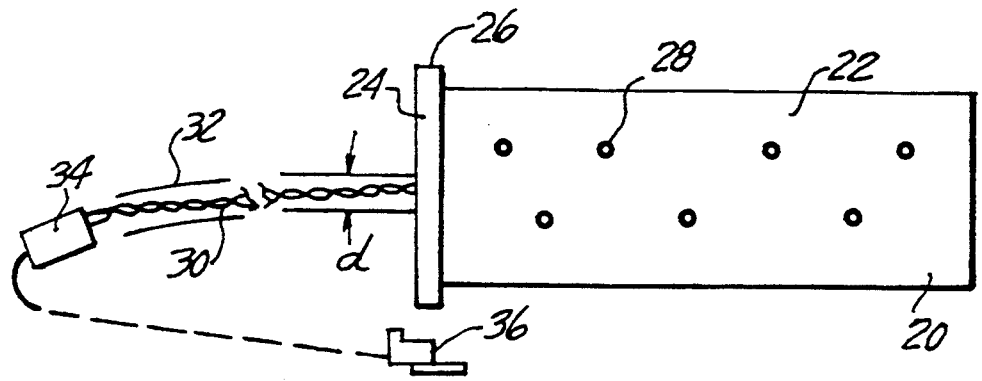
FIG. 1 illustrates a typical passenger side inflator.

With reference to the figures there is shown a cover 50 which is to be secured about the end portion 24 of the inflator to protect a wire or wires 30 extending from the inflator. The cover 50 includes a top 52 which comprises a circular shaped first portion 54 and a narrow three sided flange portion 56 extending radially outward from the top 52. The cover additionally includes a cylindrically shaped first wall 58 that extends downwardly from the first portion 54. As can be seen from FIG. 3 the first wall includes first and second ends 60 and 62 on an inside surface and a bottom surface or shoulder 64 (see FIG. 4). The first wall terminates generally in the vacinity of the flange portion 56 with the first and second ends 60 and 62 respectively separated by a space 65. The inner surface 66 of the first wall has a diameter that is smaller than the diameter of the end portion 24. As will be described the top, first wall, and end portion of the inflator define a chamber for receipt of at least a portion of the wire 30.

Figure 3:
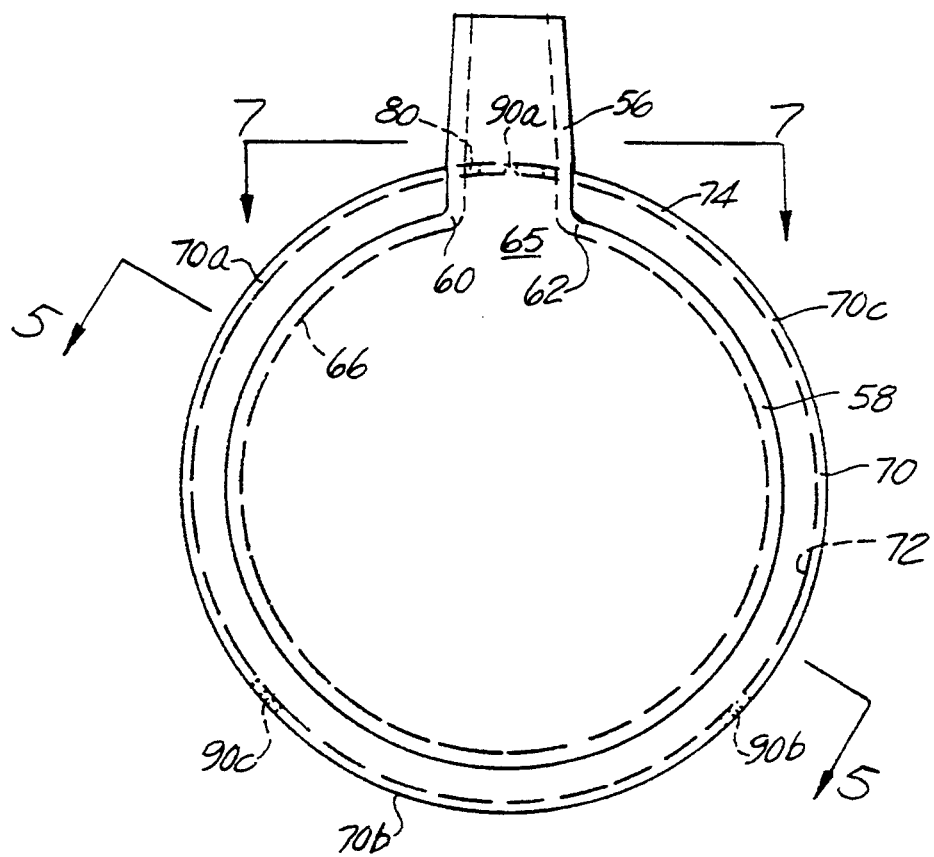
FIG. 3 is a top plan view of the cover.

The cover 50 includes a cylindrically shaped second wall 70 that extends downwardly from the first wall 58. The inner surface 72 of the second wall 70 includes a groove 74 sized to receive the edge or lip 26 of the inflator 20. The groove is formed just below the bottom or shoulder 64 and extends about the inner surface 74, but may terminate in that portion of the inner surface 74 adjacent the space 65. With reference to FIG. 3, it can be seen that in this first embodiment the groove 74 extends about the entire inner surface 72 of wall 70.

Figure 2:
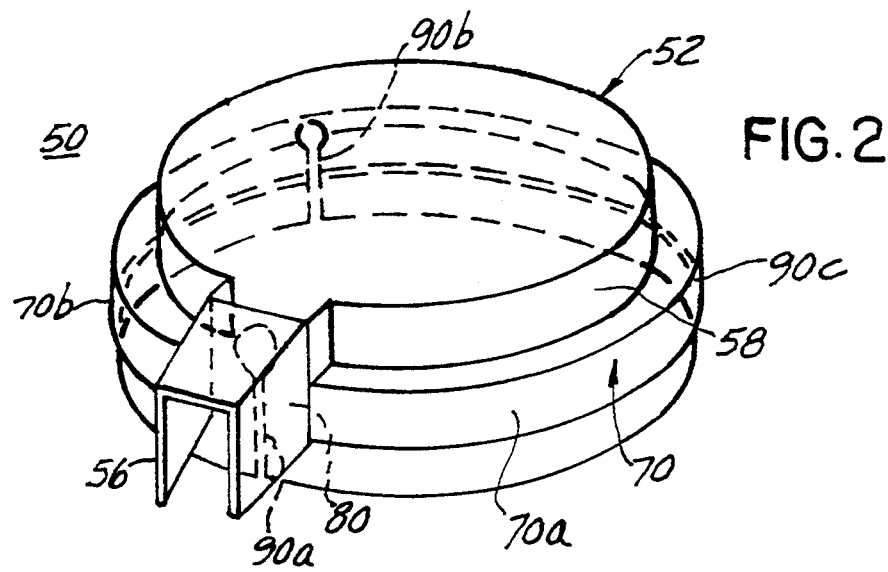
FIG. 2 illustrates an isometric view of a cover.
Figure 7:
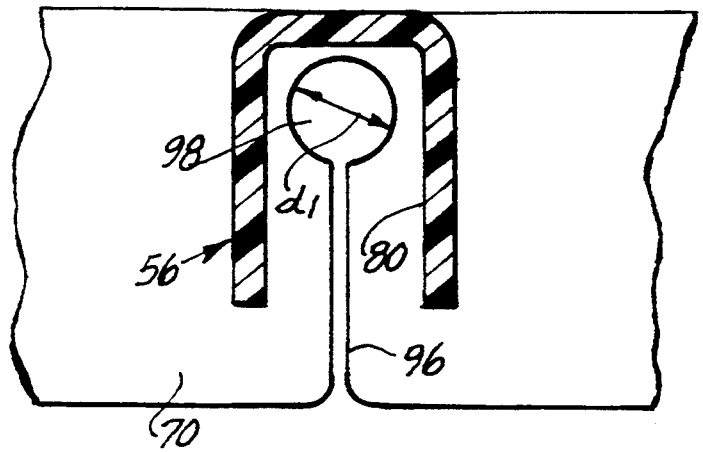
FIGS. 6 and 7 show partial views of wall portions of the cover.
Figure 4:
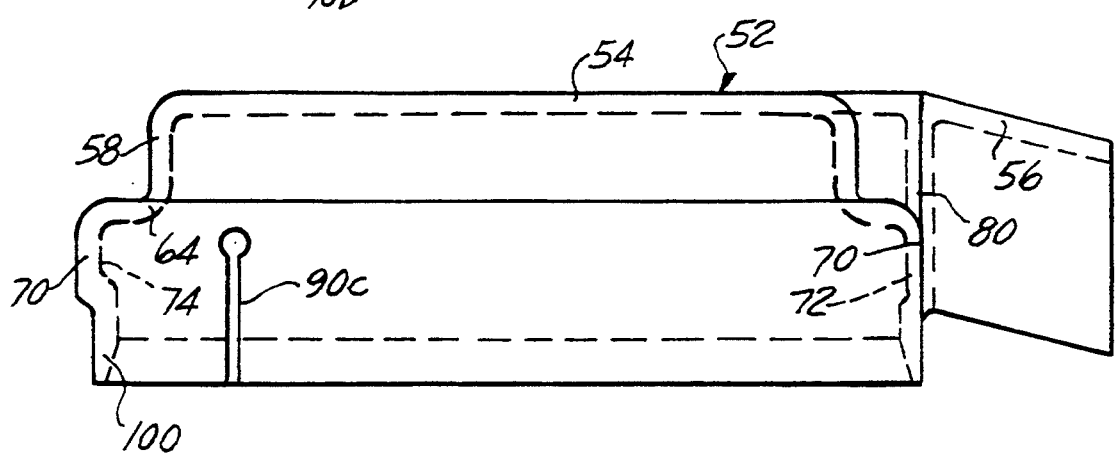
FIG. 4 is a side plan view of the cover.
Figure 6:
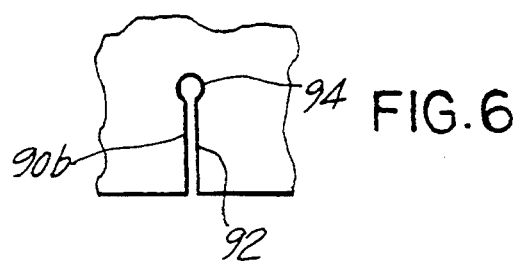

With reference to FIGS. 2 and 4, it can be seen that the wall 70 includes a portion 80 which extends upwardly joining the first and second ends 60 and 62 of the first wall effectively closing the space 65 therebetween. The cover, in the second wall 70, includes means for permitting the wall 70 to expand or flex as the cover 50 is slid or snapped fit over the end portion 24 of the inflator. As can be seen from FIGS. 2, 3 and 4 the second wall 70 comprises walled sections 70a,b and c which are separated by expansion slits or grooves 90a, b and c. Reference is now briefly made to FIG. 6 which shows the construction one of the grooves, such as groove 90b. Groove 90c is of identical construction. The groove 90b includes an axial slit 92 which terminates in an enlarged opening 94, which serves as a stress reducer. The opening 94 is located at the top of the wall 70 and just below the shoulder 64. The groove 90a is of similar construction to grooves 90b and c, but of larger dimension. FIG. 7 illustrates a cross-sectional view through Section 7—7 of FIG. 3. As can be seen, the groove 90a is located on the extending wall portion 80 and includes an axial slit 96 which terminates in an enlarged opening 98. The diameter d1 of the enlarged opening 98 is sized to be slightly larger than the effective diameter d (see FIG. 1) across the wire(s) 30.

Figure 5:
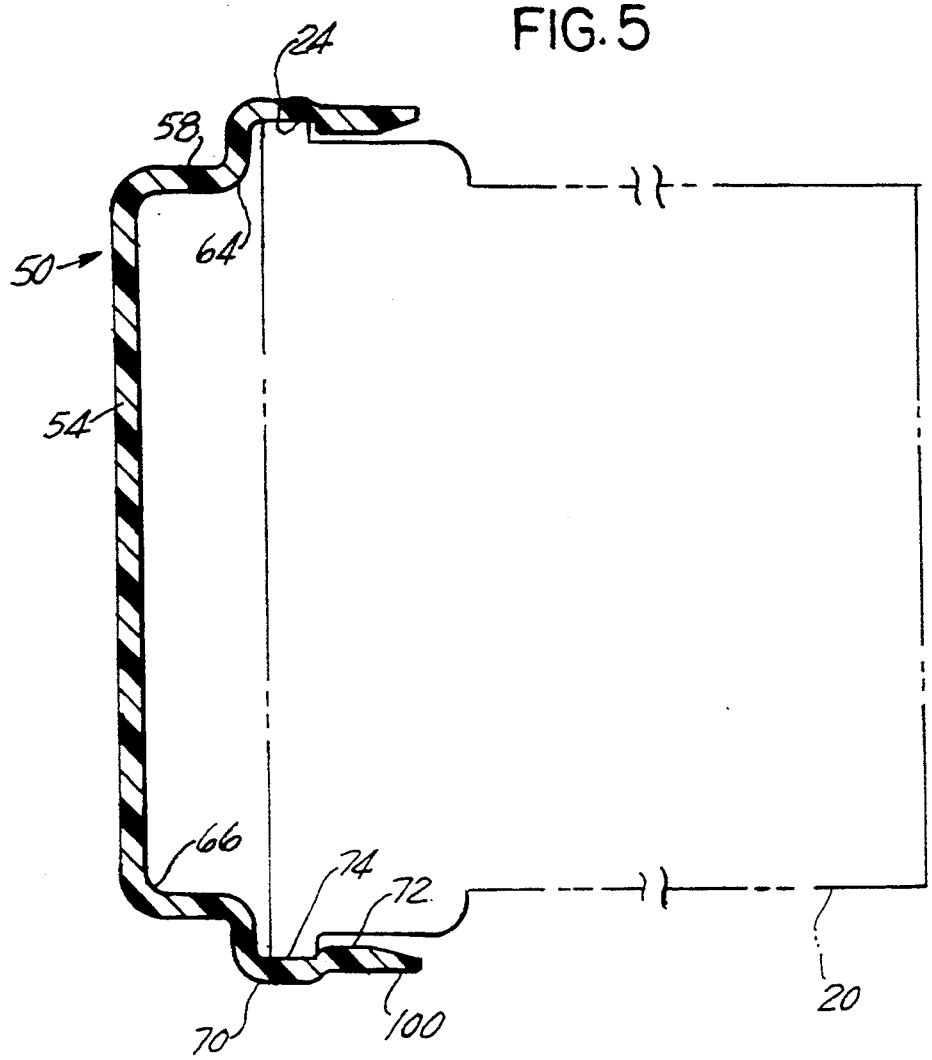
FIG. 5 is a cross-sectional view taken across section 5—5 of FIG. 3.

Reference is briefly made to the cross-sectional view shown in FIG. 4. As can be seen the lower end 100 of wall 70 is sloped to provide a chamfer which is also shown in FIG. 5. In operation the cover 50 is pushed onto the inflator 20. Prior to seating the cover 50 on the inflator, the second wall 70 of the cover is stretched outwardly to opening slit 90a. The wire 30 is moved through the slot or groove 96 and seated in the opening 98 with the connector 34 extending outwardly from the cover. The remaining portion or length of the wire 30 is coiled within the top most portion of the cover between the top 52 and first wall 58. With the wire in place, the cover is pressed upon the end portion 24 of the inflator. As the cover is pushed onto the end portion the slopped or chamfered end 100 of wall 70 urges various walled sections 70a,b and c apart. A continued pressure on the cover 50 causes the end portion 24 to slide upon the inner surface 72 of wall 70 until the wall becomes snap fitted within the groove 74.

Reference is briefly made to FIG. 5 which illustrates a cross-sectional view of the cover and shows the outline of the inflator 20 in dotted line. In addition, as mentioned above, the bottom surface 64 of the first wall 58 is arcuately shaped thereby forming a shoulder 64. Preferably, the width of the bottom surface or shoulder 64, measured from the inner surface of the second wall to the inner surface of the first wall is less than one half of the effective diameter (d) of the wire 30. In this manner if a portion of the wire is initially lodged partially under the shoulder 64, the relative size between the shoulder and the diameter of the wire permit the wire if initially trapped to be pushed therefrom by the shoulder.

FIGS. 8 and 9 illustrate another embodiment of the invention in which a cover 200 provides means to support two wire connectors within the cover. The cover 200 includes many of the same elements as described in the above figures which are referred to by the same numerals. The cover 200 includes a top 52, first wall 58, second wall 70. The second wall 70 includes a groove 74 on its inside surface. The second wall 70 and part of the first wall 58 include expansion groves 90a and 90b, having a slit 92 and an enlarged openings 94 to permit the walls to expand when placed upon the end portion 24 of the inflator 20. As can be seen from FIGS. 8 and 9 a portion of the top 52 and first wall 58 have been removed to provide a wide opening 202. Integrally formed on the bottom surface of the top 52 are two connector holders 204a and 204b. each holder 204a,b comprises a central bar 206, a rear wall 208 which extends laterally from the inside end of each bar 206. Extending outwardly from the side of each bar 206 are two wings 210 having a sloped side elevation 212, see FIG. 10. The front portion of each bar 206 includes a downwardly extending lip 214. The wire connector 34, see FIG. 11, includes on a top portion thereof a slotted U-shaped channel having opposing grooves 216 the width of the slot, w, being about equal to the width of the bar 206. Each connector 34 is positioned so that the grooves 216 envelope a corresponding one of the wings 210. The connector is slid rearwardly on the wings 210 until the connector engages the rear wall 208. In this position a front wall of the connector is snapped secured in place by the lip 214 which extends from the bar 206. The increasing thickness of the wings 210 provides for a friction fit as the connector 34 is moved rearwardly slightly expanding the plastic structure defining the grooves 216. As can be seen from FIG. 8 the cover 200 further includes a locator portion 220 extending from the inside surface of the second wall. This locator portion will be received within a recess formed in the inflator to enable the cover 200 is positioned in a predetermined orientation relative to the inflator 22. The cover 200 further includes a plurality of rectangularly shaped projections 222 extending from the bottom 64 the first wall. The bottom 224 of each projection 222 is located just above the groove 74 formed in the second wall 70. When the cover 200 is placed upon the inflator 20 these bottoms 224 sit atop the end portion 24 of the inflator 20 to decrease any tendency of the cover to slide on the inflator. It should be appreciated that mating electrical connectors, not shown, will be received through the opening or open wall 202 and attached to each connector to communicate the connectors 34 to other electrical apparatus. As can also be seen from FIG. 9 the height of each stop 210 is different thereby insuring that only a particular connector 34 can be received upon a certain one of the connector holders. It is envisioned that each of the two connectors 34 will include an extension which is design to fit properly against only one of the stops 210.

Figure 12:
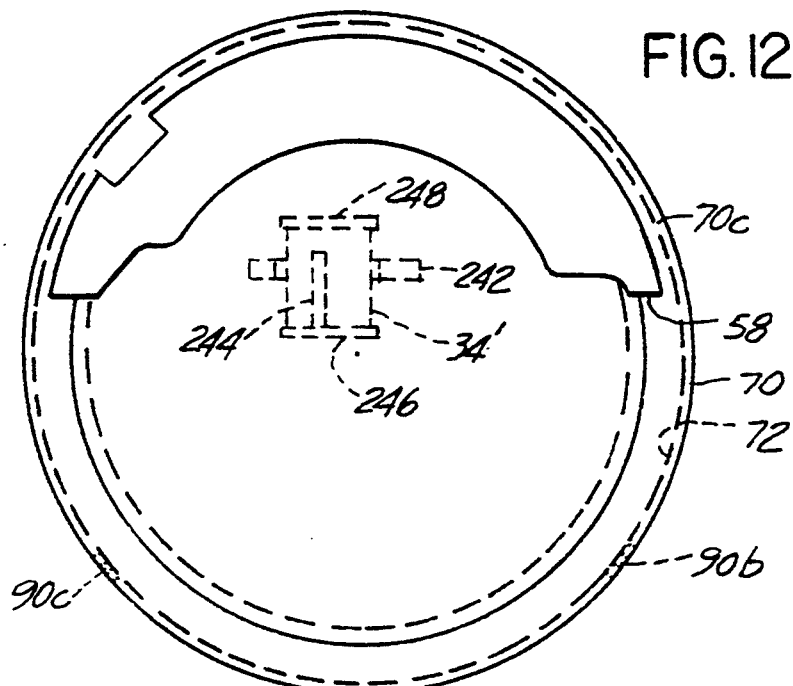
FIGS. 12 through 14 show another embodiment of the invention.
Figure 14:
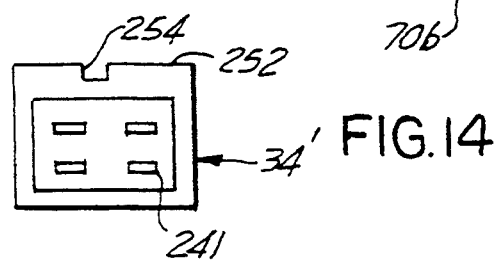
Figure 13:
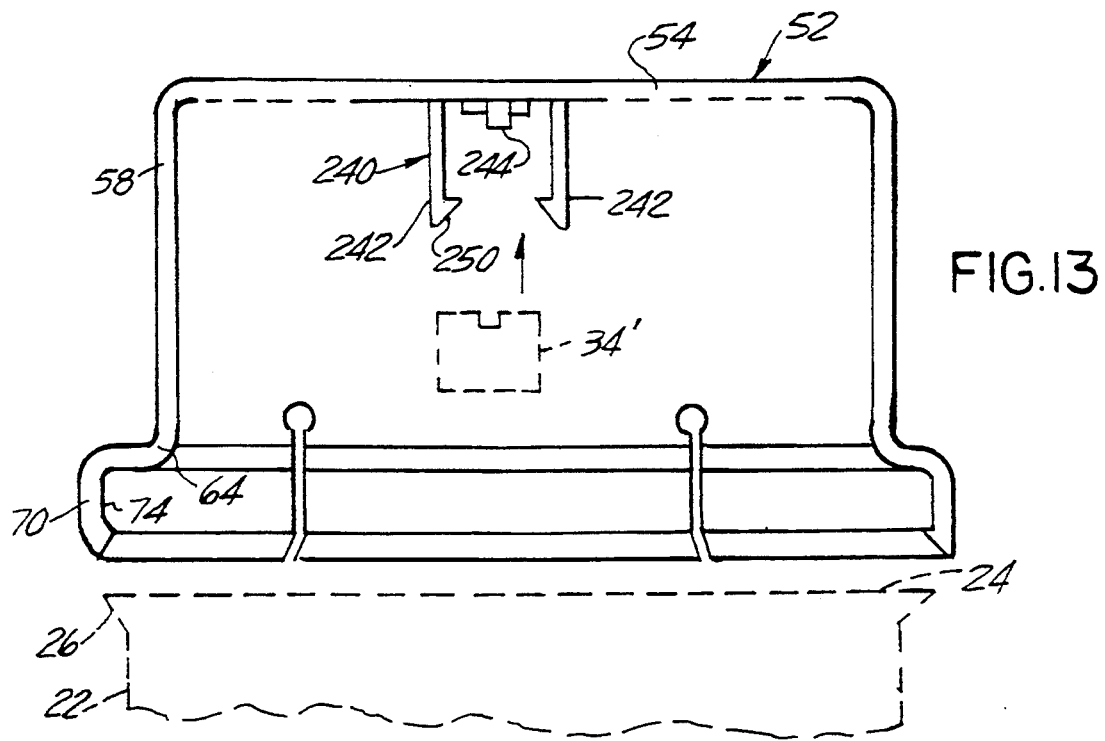

Reference is now made to FIGS. 12 and 13 which illustrate a further embodiment of the invention. FIGS. 12 and 13 are identical to FIGS. 8 and 9 in all respects with the exception that they show an alternate connector holder 240. This connector holder 240 is designed to hold a single electrical or wire connector 34'. The wire connector 34' will include a number of wire terminals 241, typically two or four, depending upon the number of wires extending from the inflator, see FIG. 14. The connector holder 240 includes a plurality of flexible, spaced apart, retaining members 242, a rectangularly shaped projection 244, a rear stop 246 and front stop 248 each extending from the bottom of the top 52. Each of the retaining members includes a hook 250 at its end. In this embodiment of the invention each connector 34' includes a top surface 252 sized to fit in between the front and rear stops and in between each retaining member. The top surface of the connector includes a groove 254 to receive the projection 244. The connector 34' is first positioned relative to the connector holder 240 and pushed in between separating the retaining members 242. When in position the connector 34' will fit in the space between the stops 246 and 248 and retaining members 242 with its top groove 254 receiving the projection 244. The hooks 250 latch or shap against the outside wall of the connector 34' to hold same in place.

Many other objects and purposes of the invention will be clear from the following detailed description of the drawings.

What is claimed is:
1. A cover (50;200) for matingly engaging one end of a gas inflator and for protecting at least one wire extending from the inflator, the at least one wire terminating in at a fist electrical connector, the inflator having a cylindrical body terminating in an end portion (24), the end portion having a diameter greater than the diameter of the body to define and edge, lip or ledge (26) extending about the body; the cover comprising: first means for enclosing a portion of the wire to inhibit the inflator from being carried by the wire, the first means including:
    a top (52);
    a first wall (58) extending downwardly from the first portion, an inner surface (66) of the first wall having a diameter smaller than the diameter of the end portion (24); the top, first wall and end of the infla- tor defining a volume for receiving the at least one wire;

a second wall (70) extending downwardly from the first wall, having an inner (72) surface, a groove (74) formed within the inner surface, to receive an edge of the end portion (24);

and means for permitting the second all to flex as it is seated upon the inflator.

2. The cover as defined in claim 1 wherein the inner surface (72) of the second wall (70) includes a chamfer or ramp (100) proximate a lower edge thereof.

3. The cover as defined in claim 1 wherein the top is at least partially circular shaped, a narrow three-sided flange portion 56 extends radially outward from the top, and wherein the first wall includes first (60) and second ends (62) and a bottom surface defining an inside shoulder (64), the first wall terminating proximate the location of the flange portion to define a space (65) between the first and second ends of the first wall, and wherein the second wall includes an extending portion (80) which extends upwardly to join the first and second ends of the first wall closing the space (65) therebetween and wherein the extending portion includes including second means for permitting a portion of the at least one wire connected to the first connector to radially exit from the cover, the remaining portion of the at least one wire retained in the volume below the top and between the first wall, including.

4. The cover as defined in claim 3 wherein the second means second means includes in a narrow slitted opening (96) and an enlarged opening (98) above the slitted opening, the enlarged opening located generally between the first and second ends of the first wall, the enlarged opening is sufficient in size to receive at least one wire with a corresponding connector extending therefrom.

5. The cover as defined in claim 4 wherein the flex means comprises expansion slits or grooves (90a,b,c).

6. The cover as defined in claim 4 wherein one of the expansion slits (90a) is located in the extending portion (80) and is part of the second means.

7. The cover as defined in claim 3 wherein the bottom surface (64) of the first wall is arcuately shaped and wherein the width of the first wall, measured from the inner surface of the second wall to the inner surface of the first wall is less than or equal to one half the effective diameter of the at least one wire.

8. A cover (50;200) for matingly engaging one end of a gas inflator and for protecting at least one wire extending from the inflator, the at least one wire terminating in at least one electrical connector, the inflator having a cylindrical body terminating in an end portion (24), the end portion having a diameter greater than the diameter of the body to define an edge, lip or ledge (26) extending about the body; the cover comprising:

a top (52);

a first wall (58) extending downwardly from the first portion, an inner surface (66) of the first wall having a diameter smaller than the diameter of the end portion (24); the top, first wall and end of the inflator defining a volume for receiving the at least one wire;

a second wall (70) extending downwardly from the first wall, having an inner (72) surface, a groove (74) formed within the inner surface, to receive an edge of the end portion (24);

and means for permitting the second wall to flex as it is seated upon the inflator including holding means, located on the underside of the top, for holding at least one wire connector and wherein a portion of the cover is removed to provide access to the at lest one electrical connector.

9. The cover as defined in claim 8 including two electrical connectors and means for holding these two electrical connectors to the underside of the cover.

10. The cover as defined in claim 9 wherein the holding means includes two connector holders each of which includes means for differentiating between the two wire connectors such that only one of the electrical connectors is connectable to a particular connector holder.

* * * * *